US012789666B2

(12) United States Patent
Li

(10) Patent No.: US 12,789,666 B2
(45) Date of Patent: Nov. 10, 2026

(54) QUICK BATTERY REPLACEMENT SYSTEM AND BATTERY REPLACEMENT OPERATION METHOD FOR VEHICLE IN LONG-DISTANCE TRANSPORT PATH

(71) Applicants: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY FARIZON NEW ENERGY COMMERICAL VEHICLE GROUP CO., LTD., Hangzhou (CN)

( * ) Notice: Subject to any disclaimer, the term of this patent is extended or adjusted under 35 U.S.C. 154(b) by 723 days.

(21) Appl. No.: 18/315,796

(22) Filed: May 11, 2023

(65) Prior Publication Data

US 2023/0278458 A1 Sep. 7, 2023

Related U.S. Application Data

(63) Continuation of application No. PCT/CN2020/139409, filed on Dec. 25, 2020.

(30) Foreign Application Priority Data

Nov. 20, 2020 (CN) ......................... 202011312545.8

(51) Int. Cl.

*B60L 53/80* (2019.01)
*B60L 53/53* (2019.01)
*B60L 53/66* (2019.01)

(52) U.S. Cl.

CPC ............... *B60L 53/80* (2019.02); *B60L 53/53* (2019.02); *B60L 53/66* (2019.02)

(58) Field of Classification Search

CPC .......... B60L 53/80; B60L 53/53; B60L 53/66; B60L 53/14; B60L 53/30; B60L 53/305;

(Continued)

(56) References Cited

U.S. PATENT DOCUMENTS

2012/0194346 A1 8/2012 Tsai et al.
2013/0332370 A1* 12/2013 Hyde ...................... B60L 58/10 705/306

(Continued)

FOREIGN PATENT DOCUMENTS

CN 103745354 A 4/2014
CN 104973057 A 10/2015

(Continued)

OTHER PUBLICATIONS

Notice of Reasons for Refusal issued in counterpart Japanese Patent Application No. JP 2023-550341, dated Apr. 30, 2024.

(Continued)

*Primary Examiner* — David V Henze
(74) *Attorney, Agent, or Firm* — Westbridge IP LLC

(57) ABSTRACT

Disclosed are a quick battery replacement system and a battery replacement operation method for a vehicle in a long-distance transport path. The system includes: battery replacement stations provided at intervals along the long-distance transport path for replacing quickly and charging a battery of a vehicle whose battery is able to be quickly replaced; a cloud-based battery replacement service platform connected to the battery replacement stations and the vehicle via a network for managing the battery replacement stations and providing services to the vehicle; and the vehicle obtaining distribution information, battery status (Continued)

information and service information of the battery replacement stations through the cloud-based battery replacement service platform.

13 Claims, 7 Drawing Sheets

(58) Field of Classification Search
CPC .......... B60L 53/64; B60L 53/68; B60L 53/00; B60L 53/60; G06Q 10/047; G06Q 50/06; G06Q 50/40
See application file for complete search history.

(56) References Cited

U.S. PATENT DOCUMENTS

| | | | | |
|---|---|---|---|---|
| 2013/0339072 | A1 | 12/2013 | Touge | |
| 2016/0117759 | A1* | 4/2016 | Penilla | B60L 53/305 705/26.9 |
| 2020/0346553 | A1 | 11/2020 | Grimm et al. | |
| 2020/0391602 | A1* | 12/2020 | Ikui | H01M 10/48 |

FOREIGN PATENT DOCUMENTS

| | | | |
|---|---|---|---|
| CN | 105083234 | A | 11/2015 |
| CN | 105182884 | A | 12/2015 |
| CN | 106709600 | A | 5/2017 |
| CN | 107797534 | A | 3/2018 |
| CN | 108199100 | A | 6/2018 |
| CN | 108366134 | A | 8/2018 |
| CN | 110435429 | A | 11/2019 |
| CN | 110599023 | A | 12/2019 |
| CN | 110619091 | A | 12/2019 |
| CN | 111723960 | A | 9/2020 |
| JP | H07503837 | A | 4/1995 |
| JP | 2014035295 | A | 2/2014 |
| JP | 2014056589 | A | 3/2014 |
| JP | 2019082415 | A | 5/2019 |
| JP | 2019140908 | A | 8/2019 |
| JP | 2019145088 | A | 8/2019 |
| KR | 20140142787 | A | 12/2014 |
| KR | 20190034341 | A | 4/2019 |
| KR | 20190096869 | A | 8/2019 |
| WO | 2015121852 | A1 | 8/2015 |
| WO | 2018061415 | A1 | 4/2018 |
| WO | 2019163681 | A1 | 8/2019 |
| WO | 2020203544 | A1 | 10/2020 |

OTHER PUBLICATIONS

Request for the Submission of an Opinion issued in counterpart Korean Patent Application No. KR 10-2023-7018310, dated Dec. 17, 2024.
Notification to Grant Patent Right for Invention issued in counterpart Russian Patent Application No. 2023113219/11, dated Jan. 9, 2024.
Chinese Investment Yearbook 2015, China Jihua Press, p. 537, dated May 31, 2016.
First Office Action issued in counterpart Chinese Patent Application No. 202011312545.8, dated Jan. 6, 2022.
International Search Report and Written Opinion issued in corresponding PCT Application No. PCT/CN2020/139409, dated Jul. 26, 2021.
Notification to Grant Patent Right for Invention issued in counterpart Chinese Patent Application No. 202011312545.8, dated Oct. 19, 2022.
Second Office Action issued in counterpart Chinese Patent Application No. 202011312545.8, dated May 5, 2022.
Third Office Action issued in counterpart Chinese Patent Application No. 202011312545.8, dated Aug. 8, 2022.
First Office Action issued in counterpart Chinese Patent Application No. 202310003764.5, dated Jun. 23, 2025.
Written Decision on Registration issued in counterpart Korean Patent Application No. KR 10-2023-7018310, dated Jun. 17, 2025.
Notice of Reasons for Refusal issued in counterpart Japanese Patent Application No. 2023-550341, dated Aug. 18, 2026.

* cited by examiner

| working mode | the number of motor being working | shift gear |
|---|---|---|
| EV1 | 1 | 1 |
| EV2 | 1 | 2 |
| EV3 | 2 | 1 |
| EV4 | 2 | 2 |
| EV5 | 3 | 1 |
| EV6 | 3 | 2 |
| EV7 | 4 | 1 |
| EV8 | 4 | 2 |

QUICK BATTERY REPLACEMENT SYSTEM AND BATTERY REPLACEMENT OPERATION METHOD FOR VEHICLE IN LONG-DISTANCE TRANSPORT PATH

CROSS-REFERENCE TO RELATED APPLICATIONS

This application is a continuation application of International Application No. PCT/CN2020/139409, filed on Dec. 25, 2020, which claims priority to Chinese Patent Application No. 202011312545.8, filed on Nov. 20, 2020. The disclosures of the above-mentioned applications are incorporated herein by reference in their entireties.

TECHNICAL FIELD

The present application relates to the field of vehicle technology, in particular, to a quick battery replacement system and a battery replacement operation method for a vehicle in a long-distance transport path.

BACKGROUND

New energy vehicles have gained great development because of their energy-saving and environmental protection characteristics, but new energy vehicles also have the problem of short mileage, which leads to mileage anxiety of consumers and thus affects the promotion of new energy vehicles. In order to solve the mileage anxiety, the relevant technology can provide charging service for new energy vehicles by setting up charging piles, but the charging piles can hardly meet the demand of vehicles with larger battery capacity to obtain electricity quickly, so it cannot solve the mileage anxiety problem for these vehicles; especially in the long-distance transport path scenario, the problem of short mileage of new energy vehicles is further highlighted.

With the development of the industry, it is proposed that the problem of short mileage of new energy vehicles can be solved based on battery replacement technology, which provides a new idea to solve the mileage anxiety, but there is a lack of technical solutions according to battery replacement technology to provide quick access to electricity for users of new energy vehicles, which also affects the landing and promotion of battery replacement technology.

In addition, in the long-distance transport path, if the battery is large and heavy, the power loss of the vehicle will be greatly increased. In the existing technology, the battery replacement station, the vehicle, the battery replacement station operation service are independent. how to combine the distribution and driving distance of battery replacement station, the power and efficiency of motors used by the vehicle, and affiliated service information of battery replacement station in time, to achieve Internet of everything on the long-distance transport path through their relationships. How to make the use of drivers easily and promote the market of battery replacement stations is difficult for existing technology.

SUMMARY

In view of the above problems, the present application provides a quick battery replacement system and a replacement system operation method for a vehicle in a long-distance transport path that solve the above problems or at least partially the above problems.

Based on the first aspect of the embodiments of the present application, it provides a quick battery replacement system for a long-distance transport path, including: battery replacement stations provided at intervals along the long-distance transport path for replacing quickly and charging a battery of a vehicle whose battery is able to be quickly replaced; a cloud-based battery replacement service platform connected to the battery replacement stations and the vehicle via a network for managing the battery replacement stations and providing services to the vehicle; and the vehicle obtaining distribution information, battery status information and service information of the battery replacement stations through the cloud-based battery replacement service platform.

In an embodiment, the cloud-based battery replacement service platform, includes: a battery replacement solution processing module for determining a battery replacement solution according to the distribution information and the service information of the battery replacement stations provided along the long-distance transport path and battery information of the vehicle, and pushing the battery replacement solution to the vehicle free of charge or for a fee; a battery replacement station management module for interacting with and managing the battery replacement stations; and a vehicle real-time interaction module for interacting with the vehicle, and sending an alert to the vehicle and providing a real-time service to the vehicle.

In an embodiment, the cloud-based battery replacement service platform further includes a promotion module for identifying a vehicle whose battery is being replaced, in response that the vehicle is not registered to use battery replacement solution push service on the cloud-based battery replacement service platform, generating a first promotion message for promoting the cloud-based battery replacement service platform and pushing the first promotion message to the vehicle; and in response that the vehicle is already registered to use the cloud-based battery replacement service platform, pushing a third promotion message to the vehicle, wherein the third promotion message comprises an instant message from physical states for catering, entertainment, maintenance, shopping near the battery replacement station to operate.

In an embodiment, the promotion module is further configured for generating and pushing a second promotion message to a terminal held by an operation and maintenance personnel of the cloud-based battery replacement service platform to trigger manual service.

In an embodiment, the vehicle real-time interaction module is configured further for obtaining driving modes of the vehicle, the driving modes of the vehicle comprise an intelligent mode and a driver takeover mode, wherein the intelligent mode is configured for autonomously selecting a driving strategy of a motor according to load weight, and the driver module is configured for autonomously selecting a driving strategy of the motor by driver, and the driving strategy of the motor supports a single motor mode and/or a multi-motor mode.

In an embodiment, two adjacent battery replacement stations are spaced 30 km-600 km on the long-distance transport path.

In an embodiment, the vehicle is a pure electric vehicle, an extended program electric vehicle or a plug-in hybrid vehicle, and the vehicle is a cargo vehicle, a dump vehicle, a tractor or a semi-trailer.

In an embodiment, each battery replacement station is provided with a battery replacement station control unit, a battery storage device, a battery charging device, a quick battery replacement device and a battery maintenance device; the battery storage device for providing battery hosting services and storing batteries in the battery replacement stations; the battery charging device for providing battery charging services; the quick battery replacement device for providing battery replacement services; the battery maintenance device for testing and maintaining the batteries; and the battery replacement station control unit for communicating with the cloud-based battery replacement service platform and controlling the battery storage device, the battery charging device, the quick battery replacement device and the battery maintenance device.

The second aspect of the present application provides a battery replacement operation method, applied on the quick battery replacement system for a long-distance transport path according to the first aspect, the method includes: a vehicle whose battery is able to be quickly replaced transmitting a starting point, an ending point of the long-distance transport path and battery information to a cloud-based battery replacement service platform; the cloud-based battery replacement service platform determining the long-distance transport path according to the starting point and the ending point and determining distribution information and service information of the battery replacement stations provided along the long-distance transport path, and determining a battery replacement solution according to the distribution information and the service information of the battery replacement stations provided along the long-distance transport path and the battery information, and pushing the battery replacement solution to the vehicle; and the vehicle going to the battery replacement station in the battery replacement solution for battery replacement according to the battery replacement solution.

In an embodiment, the method further includes a registration of the vehicle, the registration of the vehicle includes: the vehicle accessing and registering on the cloud-based battery replacement service platform; the cloud battery replacement service platform verifying the vehicle according to information of the registration; and in response that the verification is passed, the registration of the vehicle is passed.

In an embodiment, the registration is fee-based registration or free registration.

The third aspect of the present application provides a battery replacement operation method, applied on a cloud-based battery replacement service platform in the quick battery replacement system for a long-distance transport path according to the first aspect, the method including: obtaining a starting point, an ending point of the long-distance transport path and battery information of a vehicle whose battery is able to be quickly replaced; determining a long-distance transport path according to the starting point and the ending point; obtaining distribution information and service information of the battery replacement stations provided along the long-distance transport path; determining a battery replacement solution according to the distribution information and service information of the battery replacement stations provided along the long-distance transport path and the battery information; and pushing the battery replacement solution to the vehicle.

In an embodiment, the determining the battery replacement solution according to the distribution information and service information of the battery replacement stations provided along the long-distance transport path and the battery information includes: determining a long-distance transport road condition according to the long-distance transport path; obtaining model information of the vehicle, and determining a corresponding driving strategy of a motor according to the model information; determining an estimated long-distance driving distance of the vehicle according to the driving strategy of the motor, the long-distance transport path and the long-distance transport road condition; determining a current remaining driving distance of the vehicle according to the battery information; determining whether planning conditions for the battery replacement solution are met according to the current remaining driving distance and the estimated long-distance driving distance; and in response that the planning conditions for the battery replacement solution are met, generating at least one battery replacement solution according to the distribution information and service information of the battery replacement station and the battery information, and pushing the at least one battery replacement solution to the vehicle.

In an embodiment, the driving strategy of the motor includes a first driving strategy and a second driving strategy, the first driving strategy is configured to describe a working state of the motor under each long-distance transport road condition and the second driving strategy is configured to describe a working state of the motor under each gear; wherein the working state of the motor is presented by a number of motors in the working state and power consumption of each motor in the working state.

In an embodiment, the distribution information of the battery replacement station comprises an identification of the battery replacement station and a location of the battery replacement station, the service information includes businesses supported currently by the battery replacement station corresponding to the identification of the battery replacement station, the business includes a battery maintenance business, a battery hosting business, a battery charging business and/or a battery leasing business; the generating at least one battery replacement solution according to the distribution information and service information of the battery replacement station and the battery information includes: determining at least one target battery replacement station and a target business provided by the at least one target battery replacement station according to the distribution information and service information of the battery replacement station and the battery information; generating at least one candidate battery replacement solution according to the identification, location and target service of the at least one target battery replacement station; and determining at least one battery replacement solution in the at least one candidate battery replacement solution according to selection conditions of preset solutions.

In an embodiment, the battery information includes a battery identification and a battery capacity; the determining at least one target battery replacement station according to the distribution information and service information of the battery replacement station and the battery information includes: determining, according to each battery identification, a latest detecting status of the battery corresponding to each battery identification; making a first determination, according to the latest detecting status and operation parameters of the vehicle, to determine whether the battery corresponding to each battery identification needs to be maintained; making a second determination, according to the battery capacity corresponding to the each battery identification, to determine whether the battery corresponding to each battery identification needs to be replaced; and determining the target battery replacement station according to a result of the first determination, a result of the second determination, the distribution information and the service information of the battery replacement station.

In an embodiment, updating, in response to a first interaction instruction, the long-distance transport path, the long-distance transport road condition, the battery information, and the distribution information and service information of the battery replacement stations provided along the long-distance transport path; repeating the step of: determining the battery replacement solution according to the distribution information and service information of the battery replacement stations provided along the long-distance transport path and the battery information.

The fourth aspect of the present application provides a battery replacement operation device, wherein the operation device operates on a cloud-based battery replacement service platform in the quick battery replacement system for a long-distance transport path according to the first aspect, the device includes: a transport path parameter acquisition module for obtaining a starting point, an ending point of the long-distance transport path and battery information of a vehicle whose battery is able to be quickly replaced; a transport path determination module for determining a long-distance transport path according to the starting point and the ending point; a battery replacement station information acquisition module for obtaining distribution information and service information of the battery replacement stations provided along the long-distance transport path; a battery replacement plan module for determining a battery replacement solution according to the distribution information and service information of the battery replacement stations provided along the long-distance transport path and the battery information; a battery replacement solution push module for pushing the battery replacement solution to the vehicle.

In an embodiment, the battery replacement plan module includes: a road condition determination unit for determining a long-distance transport road condition according to the long-distance transport path; a motor driving strategy acquisition unit for obtaining model information of the vehicle, and determining a corresponding driving strategy of a motor according to the model information; a long-distance driving estimation calculation unit for determining an estimated long-distance driving distance of the vehicle according to the driving strategy of the motor, the long-distance transport path and the long-distance transport road condition; a current remaining driving distance acquisition unit for determining a current remaining driving distance of the vehicle according to the battery information; a planning determination unit for determining whether planning conditions for the battery replacement solution are met according to the current remaining driving distance and the estimated long-distance driving distance; a planning unit for in response that planning conditions for the battery replacement solution are met, generating at least one battery replacement solution according to the distribution information and service information of the battery replacement station and the battery information, and pushing the at least one battery replacement solution to the vehicle.

The fifth aspect of the present application provides a storage medium, wherein when instructions in the storage medium are executed by a processor of an electronic device, an electronic device performs a battery replacement operation method according to the first aspect, or a battery replacement operation method according to the second aspect.

The present application provides a quick battery replacement system and a battery replacement operation method for the vehicle in long-distance transport path. Battery replacement stations in long-distance transport path are setup, such that they can provide a battery replacement service for vehicles whose batteries can be replaced quickly driving in long-distance transport path scenarios, and provide the service to vehicles by leasing batteries to support quick battery replacement for vehicles, thus relieving users' mileage anxiety about vehicles in long-distance transport path scenarios. Further, it is also possible to automatically plan a battery replacement solution for the vehicle according to the actual situation of the long-distance transport path and the battery information of the vehicle, to make the battery replacement solution economical and reasonable, and the user only needs to go to the battery replacement station according to the battery replacement solution, and no longer needs to worry about whether the power of the battery of the vehicle is sufficient, the mileage anxiety is solved.

Through the cloud-based battery replacement service platform, the present application connects the original mutually independent battery replacement stations, vehicles and battery replacement station operation service modules together, and provides customers with a comprehensive distribution, an electric energy planning, a battery replacement solution and affiliated service information of the battery replacement station according to load weight of the vehicle, distance to the destination and road conditions, to realize the interconnection of vehicles, stations and batteries in the long-distance transport path, which not only relieves users' mileage anxiety about vehicles in long-distance transport path scenarios, but also improves the operation efficiency of the battery replacement station, reduces cost of transportation, and achieves the innovative goal that the pure electric vehicle drives over 350 KM.

The above description is only an overview of the technical solution of the present application. In order to be able to understand more clearly the technical means of the present application, it can be implemented in accordance with the contents of the specification, and in order to make the above and other purposes, features and advantages of the present application more obvious and understandable, the following specific embodiments of the present application are cited.

According to the following detailed description of specific embodiments of the present application in conjunction with the drawings, other objects, advantages and features of the present application will be better understood by those skilled in the art.

BRIEF DESCRIPTION OF THE DRAWINGS

Various other advantages and benefits will become apparent to those skilled in the art by reading the detailed description of the preferred embodiment below. The accompanying drawings are for the purpose of illustrating the preferred embodiment only and are not considered to be a limitation of the present application. Moreover, throughout the accompanying drawings, the same reference symbols are used to indicate the same components.

DETAILED DESCRIPTION OF THE EMBODIMENTS

Exemplary embodiments of the present application will be described in greater detail below with reference to the accompanying drawings. While exemplary embodiments of the present application are shown in the accompanying drawings, it should be understood that the present application can be implemented in various forms and should not be limited by the embodiments set forth herein. Rather, these embodiments are provided to enable a more thorough understanding of the present application and to enable the complete scope of the present application to be communicated to those skilled in the art.

Figure 1:
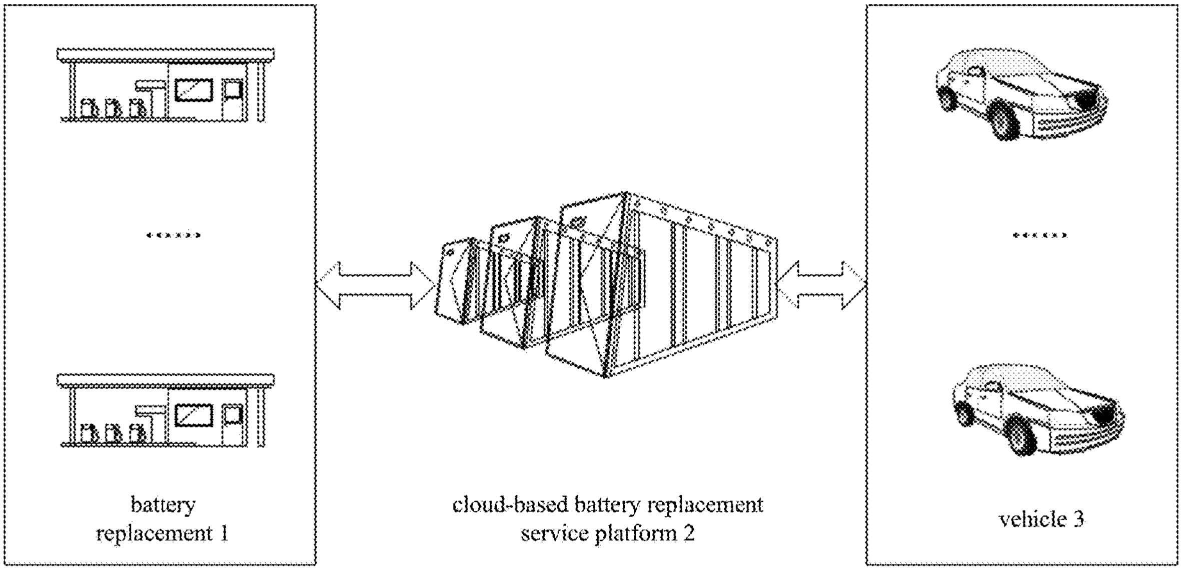
FIG. 1 is a schematic view of a quick battery replacement system in a long-distance transport path according to an embodiment of the present application.

The present application first provides a quick battery replacement system for a long-distance transport path, as shown in FIG. 1, the system includes: a plurality of battery replacement stations 1, a cloud-based battery replacement service platform 2 and the vehicle 3 whose battery can be quickly replaced.

The battery replacement stations 1 is provided at intervals along the long-distance transport path for replacing quickly and charging a battery of a vehicle 3 whose battery is able to be quickly replaced.

The cloud-based battery replacement service platform 2 is connected to the battery replacement stations 1 and the vehicle 3 via a network for managing the battery replacement stations and providing services to the vehicle 3.

The vehicle 3 obtains distribution information, battery status information and service information of the battery replacement stations 1 through the cloud-based battery replacement service platform 2. The vehicle 3 whose battery can be quickly replaced in the application embodiment can be a pure electric vehicle, an extended program electric vehicle or a plug-in hybrid vehicle, and the vehicle can be a cargo vehicle, a dump vehicle, a tractor or a semi-trailer, and the present application does not limit the type and model of the vehicle 3.

Exemplarily, the battery replacement stations 1 may be located along long-distance transport path, for example, two adjacent battery replacement stations 1 are spaced 30 km-600 km in the long-distance transport path. It ensures that the vehicle can receive adequate power replenishment during long-distance transport path by ensuring the deployment density of the battery replacement stations.

Figure 2:
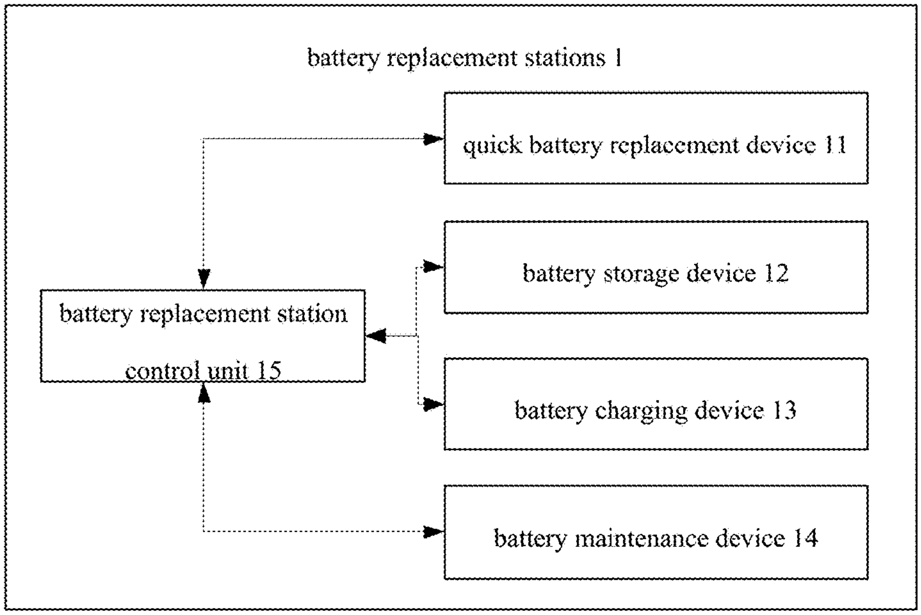
FIG. 2 is a logical block diagram of a battery replacement station according to an embodiment of the present application.

In one embodiment, as shown in FIG. 2, each of the battery replacement stations 1 can provide a battery leasing business, a battery leasing business is provided to the vehicle, to allow the vehicle to unload the battery with poor power and replace the rented fully charged battery, the quick battery replacement device 11 in the battery replacement station 1 can automatically perform the battery replacement for the user, to reduce the difficulty of battery replacement.

In the battery replacement station 1, a battery storage device 12, a battery charging device 13 and a battery maintenance device 14 may also be provided. The battery storage device 12 can be used to provide battery hosting services, and to store the batteries in the battery replacement station. In a long-distance transport path scenario, the user can unload the battery to reduce the weight of the vehicle, to obtain a longer range, and the battery storage device 12 can provide service for unloading the battery and storage service.

The battery charging device 13 can be used to provide charging services to improve the range of the vehicle by quickly charging the battery in the vehicle. In one embodiment, the battery charging device 13 and the quick battery replacement device 11 may act in parallel on the same vehicle, and charge batteries which will be not taken to replace the battery of the vehicle, thereby shortening the time the vehicle spends at the battery replacement station and significantly improving the efficiency of the vehicle getting power. In one embodiment, the battery charging device 13 can also provide the user with a separated charging, i.e., it can charge the battery with low power replaced by the quick battery replacement device 11, and when the charging is finished, the battery can be stored in the battery storage device 12.

The battery maintenance device 14 can be used for testing and maintaining the battery.

In one embodiment, the battery replacement station 1 may further include a battery replacement station control unit 15 for communicating with the cloud-based battery replacement service platform 2 and for controlling the battery storage device 12, the battery charging device 13, the quick battery replacement device 11 and the battery maintenance device 14.

Figure 3:
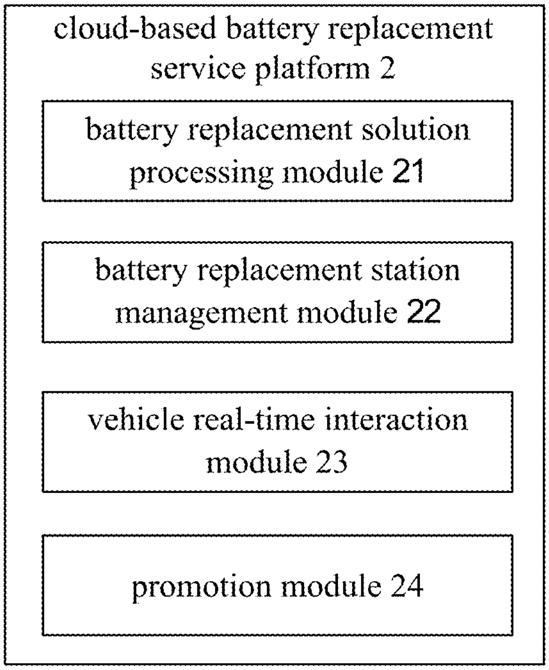
FIG. 3 is a logical block diagram of a cloud-based battery replacement service according to an embodiment of the present application.

In order to facilitate the battery replacement station 1 to provide battery replacement services for vehicles that drives for the long-distance transport path, a cloud-based battery replacement service platform 2 is provided in the present application, the cloud-based battery replacement service platform shown in FIG. 3, includes:

a battery replacement solution processing module 21 for determining a battery replacement solution according to the distribution information and the service information of the battery replacement stations provided along the long-distance transport path and the battery information of the vehicle 3, and pushing the battery replacement solution to the vehicle 3 free of charge or for a fee;

a battery replacement station management module 22 for interacting with and managing the battery replacement stations 1; and a vehicle real-time interaction module for interacting with the vehicle 3, and sending an alert to the vehicle 3 and providing a real-time service to the vehicle 3.

In one embodiment, the cloud-based battery replacement service platform 2 can interact with the vehicle 3 according to the vehicle real-time interaction module 23 to obtain the driving information and battery information of the vehicle 3 for planning the battery replacement solution for the vehicle 3, and to monitor the status of the vehicle 3 in time and to provide the vehicle 3 with a reminder of the battery replacement and to update the battery replacement solution.

In one embodiment, the cloud-based battery replacement service platform 2 can obtain service information of each battery replacement station 1 based on the interaction with the battery replacement stations 1 according to the battery replacement station management module 22, to obtain the services that the battery replacement station 1 can currently provide to the vehicle, the services can be at least one of the battery replacement service, the battery charging service, the battery hosting service, and the battery maintenance service. The cloud-based battery replacement service platform 2 may plan a battery replacement for the vehicle 3 according to the service information and the driving information and battery information of the vehicle 3. If the vehicle 3 confirms the use of a particular battery replacement plan, the battery replacement plan confirmed by vehicle 3 may also be sent to a battery replacement station in the battery replacement plan, to make a reservation to the battery replacement station, so that when the vehicle comes to the battery replacement station according to the battery replacement plan, the battery replacement station may quickly provide the vehicle with the service reserved in the battery replacement plan.

In one embodiment, the cloud-based battery replacement service platform 2 further includes a promotion module 24 for identifying a vehicle whose battery is being replaced, and in response that the vehicle is not registered to use the battery replacement solution push service on the cloud-based battery replacement service platform 2, generating a first promotion message for promoting the cloud-based battery replacement service platform 2 and pushing the first promotion message to the vehicle 3. By pushing the first promotion message, the vehicle user can be prompted to register and be informed that the user can enjoy the subsequent battery replacement solution push service free of charge or for fee, thus the number of users is increased and it facilitates the promotion of the cloud-based battery replacement service platform. If the vehicle is already registered to use the cloud-based battery replacement service platform 2, a third promotion message is pushed to the vehicle, wherein the third promotion message includes an instant message from physical states for catering, entertainment, maintenance, shopping near the battery replacement station to operate.

In one embodiment, the promotion module 24 is configured further for generating and pushing a second promotion message to a terminal held by an operation and maintenance personnel of the cloud-based battery replacement service platform 2 to trigger manual service. After being informed of the second promotion message, the operation and maintenance personnel may popularize information about the cloud-based battery replacement service platform to the vehicle's user in the form of manual service, to improve the number of users of the cloud-based battery replacement service platform and increase the operation revenue.

In one embodiment, the driver can be allowed to drive in different driving modes, and the vehicle can also be allowed to drive with driving strategies of the multiple motors, and driving strategies of the motor can be different for different driving modes, to enhance the diversity of driving strategies of the motor during actual driving, and a suitable driving strategy of the motor can save power and improve range. In order to obtain the driving strategy of the motor used by the vehicle in time, the life state of the battery is predicted reasonably for planning and pushing the battery replacement plan to the user, the vehicle real-time interaction module 23 is also used to obtain the driving mode of the vehicle, the driving mode of the vehicle includes an intelligent mode and a driver takeover mode, the intelligent mode autonomously selects a driving strategy of a motor according to load weight, and the driver module autonomously selects a driving strategy of the motor by driver, and the driving strategy of the motor supports a single motor mode and/or a multi-motor mode.

In one embodiment, the vehicle 3 includes a power battery module fixed to a frame longitudinal beam of the vehicle 3 by a locking device. The power battery module includes a battery and a battery bracket, the battery is mounted in the battery bracket, the battery and battery bracket are provided in a gantry structure. The battery bracket includes a first bracket, a second bracket and a third bracket connected in sequence, the first and the third brackets are respectively vertical to the ends of the second bracket, the second bracket is fixed horizontally to the top of the frame longitudinal beam, the second bracket is connected to the frame longitudinal beam by the locking device provided vertically. The locking device includes a locking core assembly connected to the power battery module, and a locking core assembly integrated with the frame longitudinal beam, the locking core assembly can engage with the locking core assembly. The safety structure of the battery (especially the power battery) is designed to be simple and safe, the power battery module as an energy supply device can also withstand a variety of external forces, can be efficient and reliable to replace the battery. The power battery module and heavy vehicles can be locked quickly or separated without change to the vehicle's entire structure, the adaptability is stronger and it is easy to promote. This kind of a mechanism design makes the power battery module and its skeleton into an integrated whole structure, which can ensure that the power battery module is not damaged and maintain the accurate position when it is subjected to forces in the up and down, left and right, front and rear directions and subjected to pitching, tilting and rotating torque. The mounting bracket of the power battery module is used to quickly positioning the power battery module and the heavy vehicle, and the quickly locking mechanism is used to realize the quickly locking or separation of the power battery module and the heavy vehicle.

The present application provides the quick battery replacement system in the long-distance transport path. By setting up battery replacement stations for vehicles along long-distance transport path, it can provide battery replacement services for vehicles in long-distance transport path scenarios and relieve mileage anxiety, and it can automatically customize battery replacement plan for vehicles in time according to the cloud-based battery replacement service platform, so that vehicles in the long-distance transport path can simply go to the battery replacement stations along long-distance transport path in accordance with the battery replacement plan, thus relieving drivers' driving anxiety and enabling the widespread use of new energy vehicles in long-distance transport path scenarios, to be conducive to the promotion and use of new energy vehicles, and enable the widespread use of new energy vehicles in long-distance transport path scenarios.

Figure 4:
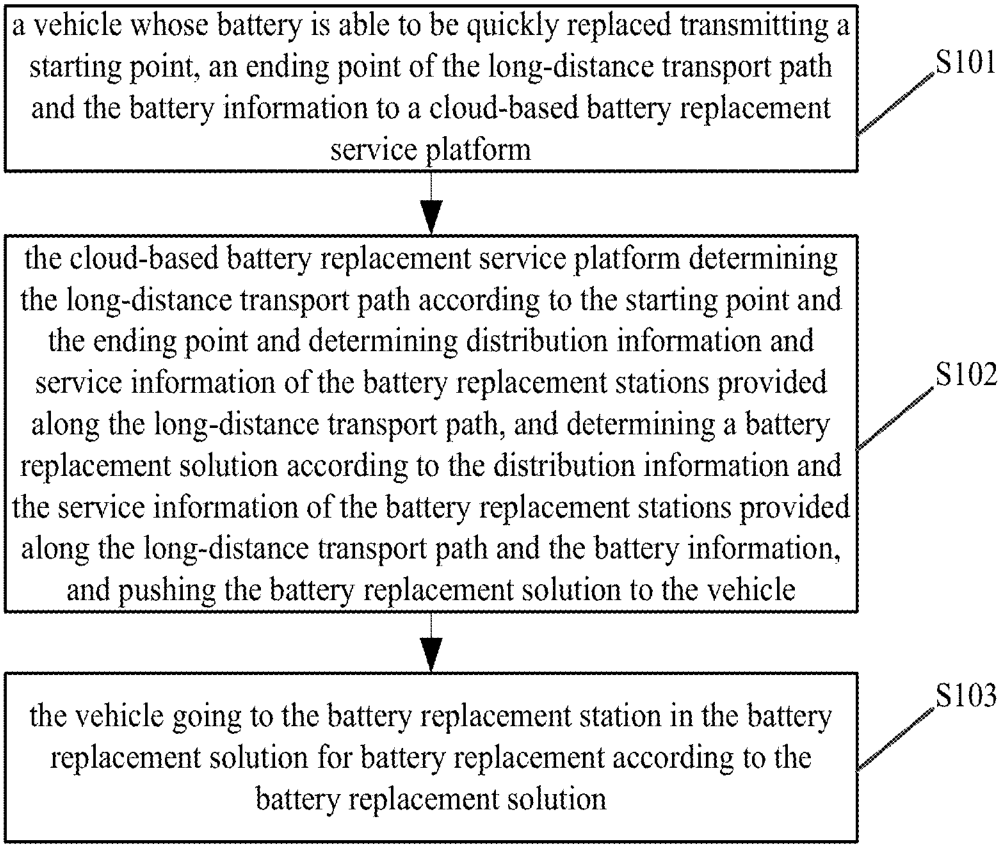
FIG. 4 is a flowchart of a battery replacement operation method according to an embodiment of the present application.

Based on the above quick battery replacement system for long-distance transport path, the present application provides a battery replacement operation method, as shown in FIG. 4, the method includes:

S101, a vehicle whose battery is able to be quickly replaced transmitting a starting point, an ending point of the long-distance transport path and the battery information to a cloud-based battery replacement service platform;

S102, the cloud-based battery replacement service platform determining the long-distance transport path according to the starting point and the ending point and determining distribution information and service information of the battery replacement stations provided along the long-distance transport path, and determining a battery replacement solution according to the distribution information and the service information of the battery replacement stations provided along the long-distance transport path and the battery information, and pushing the battery replacement solution to the vehicle;

S103, the vehicle going to the battery replacement station in the battery replacement solution for battery replacement according to the battery replacement solution.

Figure 5:
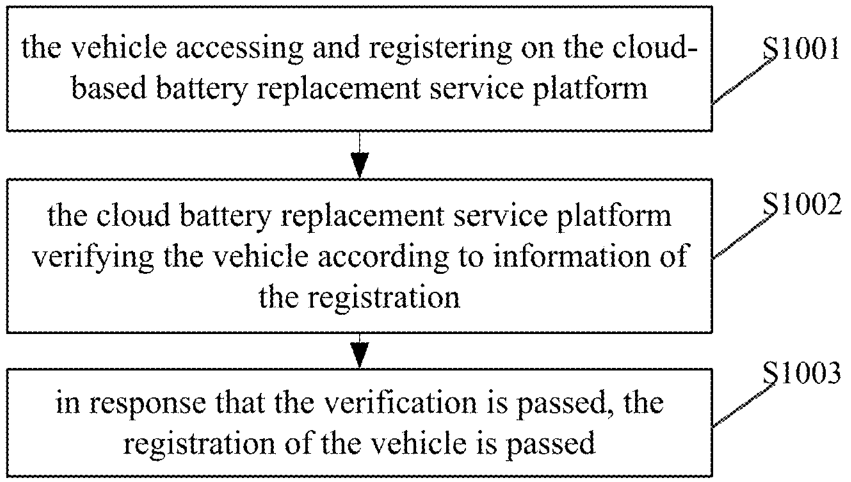
FIG. 5 is a flowchart of a cloud-based service platform for the registration of the vehicle according to an embodiment of the present application.

In one embodiment, only registered vehicles can enjoy the various services of the cloud-based battery replacement service platform, therefore, at the beginning of interaction with the cloud-based battery replacement service platform, the vehicle should first be registered on the cloud-based battery replacement service platform, as shown in FIG. 5, which illustrates the registration of the vehicle, includes:

S1001, the vehicle accessing and registering on the cloud-based battery replacement service platform.

The registration requires the entry of information required for registration, which includes but is not limited to the vehicle owner's name, license number, vehicle identification and vehicle model.

S1002, the cloud battery replacement service platform verifying the vehicle according to information of the registration;

S1003, in response that the verification is passed, the registration of the vehicle is passed.

The verification is used to ensure that the information of the registration is true and valid. The registration in the present application can be fee-based registration or free registration, if it is the fee registration, and it will be charged after the verification is passed, only the success of the fee determines that the registration is passed, the fee can use WeChat or Alipay to charge, the present application does not limit the specific channel of the fee.

In an embodiment, the cloud-based battery replacement service platform may further extract the target battery replacement stations in the battery replacement solution, generate corresponding reservation information for each the target battery replacement station according to the battery replacement solution, push the reservation information to the target battery replacement station to facilitate the target battery replacement station to provide service to the vehicle according to the reservation information.

In one embodiment, the reservation information may include an identification of the battery replacement station, a service reservation, a service reservation time, and a service battery identification. The reservation service time is estimated according to the long-distance transport path, a long-distance transport road condition, current location of the vehicle, and current time. The service battery identification is the identification of the battery being serviced in the vehicle. Exemplary, if the battery replacement solution includes:

(1) replacing the battery No. 1 in the vehicle at the battery replacement station with the identification 0001.

(2) replacing the battery No. 3 in the vehicle at the battery replacement station with the identification 0008, while charging battery No. 4 and unloading battery No. 5.

Then, accordingly, the reservation message 1 and the reservation message 2 can be generated, the reservation message 1 is sent to the battery replacement station with the identification 0001 and the reservation message 2 is sent to the battery replacement station with the identification 0008.

Exemplarily, the reservation information 1 includes:

(a) reservation service: battery replacement service; service battery identification: I; reservation service time: 14:00-14:30;

The reservation service: charging service; service battery identification: II; reservation service time: 14:00-14:30.

The reservation information 2 includes:

The reservation service: charging service; service battery identification: III; reservation service time 18:00-18:30.

The reservation service: charging service; service battery identification: IV; reservation service time 18:00-18:30.

The reservation service: unloading service; service battery identification: VII; reservation service time 18:00-18:30.

The embodiment can generate a battery replacement plan for the vehicle in time through the interaction of the vehicle, the cloud-based battery replacement service platform and the battery replacement station, and adjust the battery replacement station and the vehicle to ensure the smooth implementation of the battery replacement plan, to shorten the waiting time of the vehicle at the battery replacement station and improve the efficiency of obtaining power.

Figure 6:
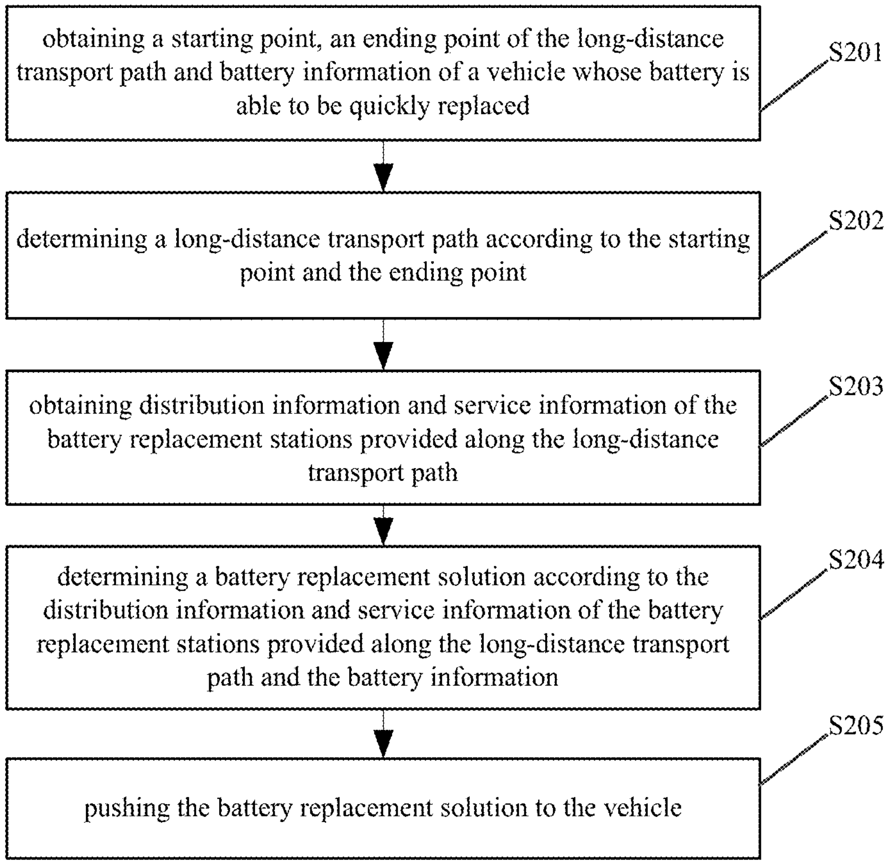
FIG. 6 is a flowchart of a battery replacement operation method according to an embodiment of the present application.

Based on the above quick battery replacement system for long-distance transport path, the present application also provides a battery replacement operation method, as shown in FIG. 6, the method includes:

S201, obtaining a starting point, an ending point of the long-distance transport path and battery information of a vehicle whose battery is able to be quickly replaced.

In this step, the starting point of the long-distance transport path may be obtained by a positioning system (e.g., GPS positioning system, Beidou satellite positioning system, etc.). The ending point can be obtained through voice and other ways, or it can be a user's choice or setting obtained according to the user's triggering of the corresponding button, or it can be prompted and obtained through the vehicle infotainment system (referred to as the vehicle system) interaction with the user. Of course, there can also be other ways to obtain the starting point and ending point of the vehicle's long-distance transport path, which are limited herein.

The vehicle in the present application can include multiple batteries, and the specification model of each battery can also be different, which are not limited herein. In some embodiments, the batteries in the same vehicle may be designed to have multiple specifications of capacity and weight. With this design, batteries with different capacities and weights can be replaced and used according to the actual application needs in different use scenarios for the purpose of maximizing energy efficiency and economy.

S202, determining a long-distance transport path according to the starting point and the ending point.

S203, obtaining distribution information and service information of the battery replacement stations provided along the long-distance transport path.

The distribution information of the battery replacement stations in the present application includes the identification of the battery replacement stations and the location of the battery replacement stations; the service information includes the services currently available to the vehicles at the battery replacement stations corresponding to the identification of each battery replacement station, the services may be at least one of a battery maintenance business, a battery hosting business, a battery charging business, and/or a battery leasing business. The battery maintenance business and the battery hosting business both allow the user to leave the battery at the battery replacement station, to improve the range of the vehicle by the reduction of the weight. The battery charging business allows charging of the vehicle, and the battery leasing business allows the user to lease a fully charged battery and provide the user with a battery replacement service by using a fully charged battery to replace a battery with low power.

S204, determining a battery replacement solution according to the distribution information and service information of the battery replacement stations provided along the long-distance transport path and the battery information.

S205, pushing the battery replacement solution to the vehicle.

Figure 7:
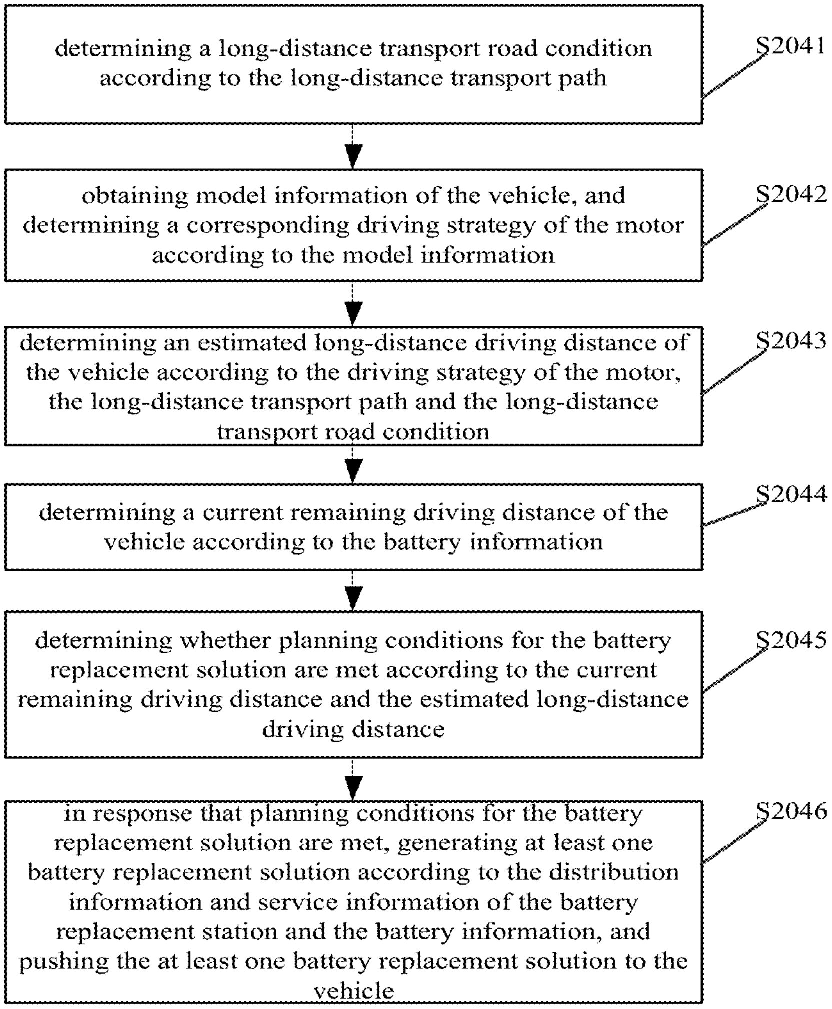
FIG. 7 is a flowchart for determining a battery replacement solution according to distribution information and service information of the battery replacement stations provided along the long-distance transport path and the battery information, according to an embodiment of the present application.

In an embodiment, the determining a battery replacement solution according to the distribution information and service information of the battery replacement stations provided along the long-distance transport path, and the battery information, as shown in FIG. 7, includes:

S2041, determining a long-distance transport road condition according to the long-distance transport path;

S2042, obtaining model information of the vehicle, and determining a corresponding driving strategy of the motor according to the model information;

S2043, determining an estimated long-distance driving distance of the vehicle according to the driving strategy of the motor, the long-distance transport path and the long-distance transport road condition.

The estimation of the long-distance driving distance of vehicles in long-distance transport path under different road conditions are also different. In some embodiments, the long-distance transport path can be segmented according to the long-distance transport road condition, and their corresponding estimated driving distances can be calculated segment by segment and aggregated to obtain the estimated long-distance driving distance. The estimated long-distance driving distance in the present application can be measured in miles or time, which is not limited herein.

The long-distance transport road condition can include: a congestion condition and a road condition, and the road condition can be graded by constructing a road condition mapping table, the long-distance transport path is segmented according to the grading result, and the estimated driving distance of each segment is calculated, so that the estimated driving distance can be accurately quantified and the calculation accuracy of the estimated long-distance driving distance can be improved.

In the related technology, many vehicles use a single high-torque, low-speed motor with reduction gear of a fixed-speed ratio, which will lead to a large weight of the electric drive system, high manufacturing costs and insufficient power performance at medium and high speeds. Therefore, in some embodiments of the present application, the efficiency of the motor can be improved and the cost of the electric drive system can be reduced by multiple motors provided in the vehicle in conjunction with a driving strategy of the motor, to allow the vehicle to have a better range, reduce power consumption, and improve the estimated driving distance under all levels of road conditions, and the estimated long-distance driving distance is improved ultimately.

In one embodiment, the driving strategy of the motor includes a first driving strategy and a second driving strategy, the first driving strategy is configured to describe a working state of the motor under each long-distance transport road condition and the second driving strategy is configured to describe a working state of the motor under each gear; the working state of the motor is described by the number of motors in the working state and the power consumption of each motor in the working state. Of course, the first driving strategy and the second driving strategy can also be used in parallel to obtain the working state of the motors in different gears under different road conditions. The working state of the motor is used to calculate the estimated driving distance for each segment.

Figures 8, 9:
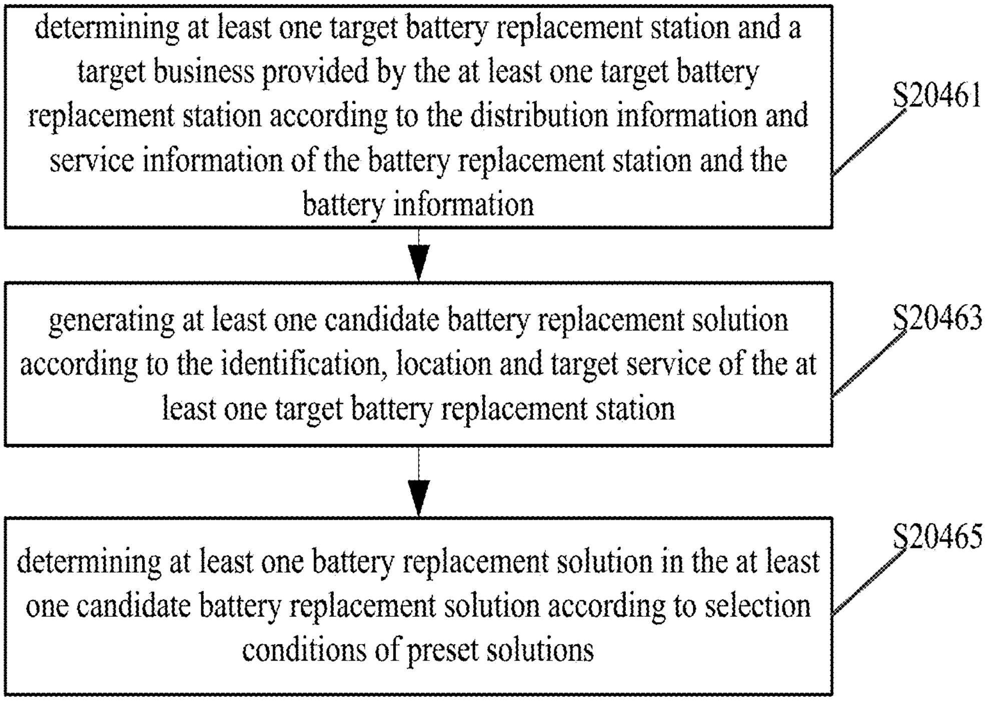
FIG. 8 is a schematic diagram of a working state of a motor according to an embodiment of the present application.
FIG. 9 is a flowchart for generating at least one battery replacement solution according to distribution information and service information of the battery replacement stations and the battery information, according to an embodiment of the present application.

Exemplarily, the schematic diagram of the working state of the motor is shown in FIG. 8. In the actual driving process of the vehicle, each power source can be used in combination to obtain eight different working states of the motors, and the working state of each motor corresponds to one driving mode (working mode). When there is only one motor working and the gearshift device is in first gear, it is defined as the first gear pure electric driving mode EV1; when there is only one motor working and the gearshift device is in second gear, it is defined as the second gear pure electric driving mode EV2; when there are two motors working and the gearshift device is in first gear, it is defined as the third gear pure electric driving mode EV3; when there are two motors working and the gearshift is in second gear, it is defined as the fourth gear pure electric driving mode EV4; when there are three motors working and the gearshift is in first gear, it is defined as the fifth gear pure electric driving mode EV5; when there are three motors working and the gearshift is in second gear, it is defined as the sixth gear pure electric driving mode EV6; when there are four motors working at the same time and the gearshift device is in first gear, it is defined as the seventh gear pure electric driving mode EV7; when there are four motors working and the gearshift device is in second gear, it is defined as the eighth gear pure electric driving mode EV8.

S2044, determining a current remaining driving distance of the vehicle according to the battery information.

S2045, determining whether planning conditions for the battery replacement solution are met according to the current remaining driving distance and the estimated long-distance driving distance.

In one embodiment, if the difference between the current remaining driving distance and the estimated long-distance driving distance is less than a first preset threshold, it is determined that the planning conditions of the battery replacement solution are met, the first preset threshold may be set according to actual needs, and the present application does not limit the specific preset method thereof and the preset distance.

S2046, in response that planning conditions for the battery replacement solution are met, generating at least one battery replacement solution according to the distribution information and service information of the battery replacement station and the battery information, and pushing the at least one battery replacement solution to the vehicle.

In an embodiment, the generating at least one battery replacement solution according to the distribution information and service information of the battery replacement station and the battery information, as shown in FIG. 9, includes:

S20461, determining at least one target battery replacement station and a target business provided by the at least one target battery replacement station according to the distribution information and service information of the battery replacement station and the battery information;

S20463, generating at least one candidate battery replacement solution according to the identification, location and target service of the at least one target battery replacement station;

S20465, determining at least one battery replacement solution in the at least one candidate battery replacement solution according to selection conditions of preset solutions.

The present application does not limit the selection conditions of preset solutions; exemplarily, the candidate battery replacement solutions may be ranked in ascending order of charges for each candidate battery replacement solution, and the top N candidate battery replacement solutions in the ranking are identified as the battery replacement solutions.

Exemplarily, at least one battery replacement solution can be determined among the at least one candidate battery replacement solution according to the driving habits of the user. For example, the closest distance, the shortest time, or the availability of additional services such as catering.

Figure 10:
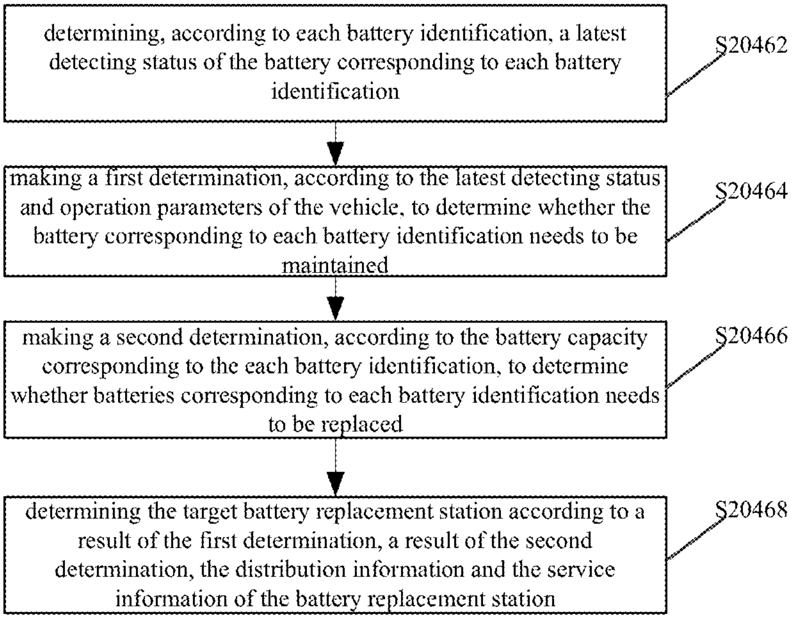
FIG. 10 is a schematic diagram of a process for generating at least one battery replacement solution according to distribution information and service information of the battery replacement station and the battery information, according to an embodiment of the present application.

In one embodiment, the generating at least one battery replacement solution according to the distribution information and service information of the battery replacement stations, and the battery information, as shown in FIG. 10, includes:

S20462, determining, according to each battery identification, a latest detecting status of the battery corresponding to each battery identification;

S20464, making a first determination, according to the latest detecting status and operation parameters of the vehicle, to determine whether the battery corresponding to each battery identification needs to be maintained.

Exemplarily, the operation parameters of the vehicle may be the operating time or mileage of the vehicle after the last detection.

For new energy vehicles, users not only have mileage anxiety but also have performance degradation anxiety, i.e., the problem will appear in the battery of new energy vehicles when in long usage, such as performance declines gradually, lower available energy, higher internal resistance, poorer consistency, higher temperature rise, lower safety and so on, and the relevant technology can usually only provide remedial measures after the battery has safety problems, but does not provide a timely assessment of the battery status. In order to provide users with more comprehensive access to electricity according to the battery replacement station, timely assessment of the vehicle's battery can be performed by the cloud-based battery replacement service platform, the cloud-based battery replacement service platform can record the repair, maintenance, charging, assessment and other actions of the battery in the vehicle, update the battery's detecting status in each record, to obtain the latest detecting status, and make a first determination, according to the latest inspection status and operating parameters of the vehicle, to determine whether a battery corresponding to each of the battery identification needs to be maintained.

In one embodiment, the battery in need of maintenance cannot be charged, but can be replaced. If the battery in need of maintenance is replaced in the battery replacement station, the battery in need of maintenance can be maintained in the battery replacement station, to combine battery maintenance and battery replacement to further provide convenience to the user.

S20466, making a second determination, according to the battery capacity corresponding to the each battery identification, to determine whether batteries corresponding to each battery identification needs to be replaced;

S20468, determining the target battery replacement station according to a result of the first determination, a result of the second determination, the distribution information and the service information of the battery replacement station.

In the present application, each battery in the vehicle can be replaced, but only the battery that does not require maintenance can be charged, and the target battery replacement station can be determined according to the result of the first determination, the result of the second determination in combination with the distribution information and service information of the battery replacement station. The specific determination method can be determined according to preset planning rules, which are not specifically limited herein. Exemplarily, the planning rule may limit the priority to use the battery replacement service for the battery that needs to be replaced, and may limit the priority to perform the battery replacement service for the battery with the lowest power, and may prioritize the charging service for the battery when its battery level is in the preset power space.

In one embodiment, a target battery replacement solution may be obtained according to interaction with the vehicle. The cloud-based battery replacement service platform may push at least one battery replacement solution for the vehicle, and in response to the user's selection instructions, one of the at least one battery replacement solution may be identified as the target battery replacement solution, i.e., the vehicle will perform the target battery replacement solution. The cloud-based battery replacement service platform may, after obtaining the target battery replacement solution, perform the following actions:

obtaining a current position of the vehicle in real-time;

in response that the distance between the current position and the target battery replacement station is less than a preset distance threshold, prompting the user to implement the target energy replenishment solution in the target battery replacement station, the target battery replacement station is the nearest battery replacement station in the target battery replacement solution to the current position;

The location of the vehicle is monitored in real-time and the alerts are provided timely alerts to the user, the user can be prevented from missing a battery replacement station in the target battery replacement solution.

In one embodiment, when the vehicle arrives at the battery replacement station to execute the target battery replacement solution, the cloud-based battery replacement service platform can update the execution progress of the target battery replacement solution accordingly.

In an embodiment, if a user misses a battery replacement station in the target battery replacement solution, does not perform a service in the target battery replacement solution in a battery replacement station in the target battery replacement solution, or performs a battery replacement or charge in another battery replacement station not in the target battery replacement solution, a first interaction instruction can be triggered so that the cloud-based battery replacement service platform can, in response to the first interaction instruction, update the long-distance transport path, the long-distance transport road condition, the battery information, and distribution information and service information of the battery replacement stations provided along the long-distance transport path. It is repeated that the step of: determining the battery replacement solution according to the distribution information and service information of the battery replacement stations provided along the long-distance transport path, and the battery information.

Exemplarily, the first interaction instruction can be sent by the vehicle or by the battery replacement station, and the cloud-based battery replacement service platform can be triggered by sending the first interaction instruction to re-evaluate whether the vehicle needs to be replaced in the remaining long-distance transport path, and to re-plan for it.

The battery replacement operation method shown in the present application can provide the vehicle with a plan of battery replacement solution, a reservation of a battery replacement solution, and battery replacement reminder service through the cloud-based battery replacement service platform, to reduce the mileage anxiety of the user and lowering the cost of the user using the new energy vehicle for long-distance transport path through reasonable planning of the battery replacement solution.

Figure 11:
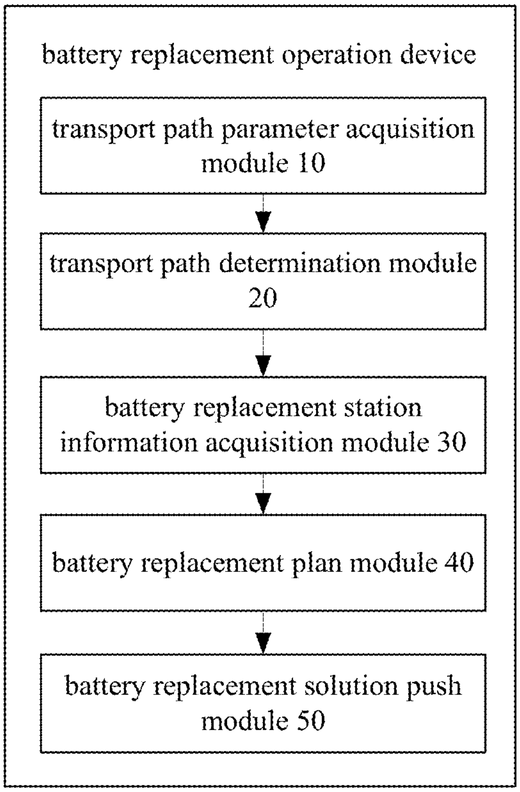
FIG. 11 is a block diagram of a battery replacement operation according to an embodiment of the present application.

Based on the same inventive idea, the embodiment of the present application also provides a battery replacement operation device, the operation device runs on the cloud-based battery replacement service platform in the quick battery replacement system for long-distance transport path, as shown in FIG. 11, the device includes:

- a transport path parameter acquisition module 10 for obtaining a starting point, an ending point of the long-distance transport path and battery information of a vehicle whose battery is able to be quickly replaced;
- a transport path determination module 20 for determining a long-distance transport path according to the starting point and the ending point;
- a battery replacement station information acquisition module 30 for obtaining distribution information and service information of the battery replacement stations provided along the long-distance transport path;
- a battery replacement plan module 40 for determining a battery replacement solution according to the distribution information and service information of the battery replacement stations provided along the long-distance transport path and the battery information;
- a battery replacement solution push module 50 for pushing the battery replacement solution to the vehicle.

Figure 12:
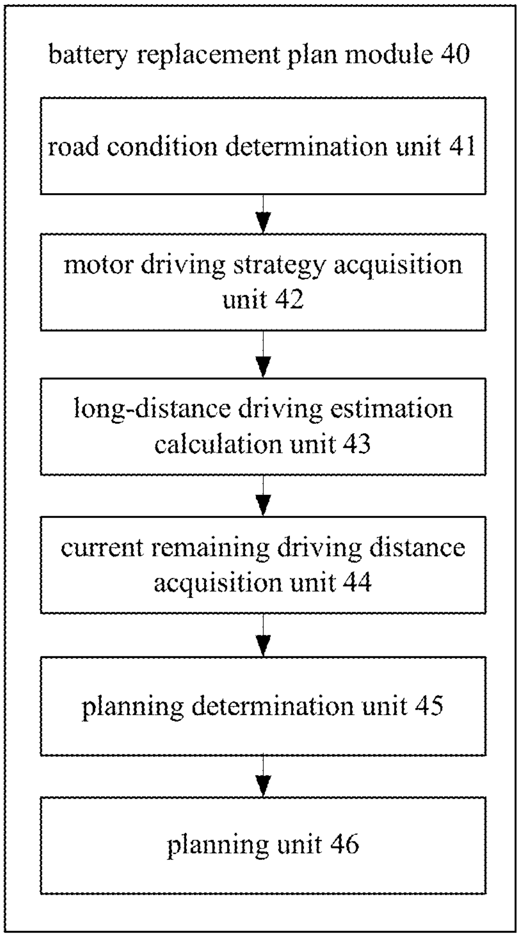
FIG. 12 is a block diagram of a battery replacement plan module according to an embodiment of the present application.

In an exemplary embodiment, as shown in FIG. 12, the battery replacement plan module 40, includes:

- a road condition determination unit 41 for determining a long-distance transport road condition according to the long-distance transport path;
- a motor driving strategy acquisition unit 42 for obtaining model information of the vehicle, and determining a corresponding driving strategy of a motor according to the model information;
- a long-distance driving estimation calculation unit 43 for determining an estimated long-distance driving distance of the vehicle according to the driving strategy of the motor, the long-distance transport path and the long-distance transport road condition;
- a current remaining driving distance acquisition unit 44 for determining a current remaining driving distance of the vehicle according to the battery information;
- a planning determination unit 45 for determining whether planning conditions for the battery replacement solution are met according to the current remaining driving distance and the estimated long-distance driving distance;
- a planning unit 46 for in response that planning conditions for the battery replacement solution are met, generating at least one battery replacement solution according to the distribution information and service information of the battery replacement station and the battery information, and pushing the at least one battery replacement solution to the vehicle.

In exemplary embodiments, it also provides a storage medium that, when the instructions in the storage medium are executed by a processor of an electronic device, the electronic device performs the steps of battery replacement operation method of the above embodiments.

In the exemplary embodiment, a computer program product is also provided, the computer program product includes computer instructions, and the computer instructions are stored in a computer readable storage medium. A processor of the electronic device reads the computer instructions from the computer-readable storage medium, and the processor executes the computer instructions, such that the electronic device performs one of battery replacement operation method provided in either of the above embodiments.

It will be clear to those skilled in the field that the specific working processes of the system, a device and a unit described above can be referred to the corresponding processes in the preceding method embodiments, and for the sake of brevity will not be described separately herein.

In addition, the functional units in each embodiment of the present application can be physically independent of each other, or two or more functional units can be integrated together, or all functional units can be integrated in a single processing unit. The above integrated functional units can be implemented either in the form of hardware, or in the form of software or firmware.

It is understood by those skilled in the art that the integrated functional unit, when implemented in the form of software and sold or used as a stand-alone product, can be stored in a computer readable storage medium. It is understood that the technical solution of the present application, in essence or in whole or in part, may be embodied in the form of a software product stored in a storage medium comprising a number of instructions to enable a computing device (e.g., a personal computer, a server, or a network device, etc.) to perform all or part of the steps of the method described in the embodiments of the present application when running the instructions. The storage medium comprises the aforementioned storage medium includes a USB flash drive, a removable hard disk, a read-only memory (ROM), a random access memory (RAM), a disk or a CD-ROM, and various other media that can store program code.

Alternatively, all or some of the steps to implement the preceding method embodiments may be accomplished by hardware (such as a computing device such as a personal computer, server, or network device) associated with program instructions, the program instructions may be stored in a computer readable storage medium, and when the program instructions are executed by a processor of the computing device, the computing device performs all or some of the steps of the method described in the embodiments of the present application. When the program instructions are executed by the processor of the computing device, the computing device performs all or some of the steps of the method described in the embodiments of the application.

Finally, it should be noted that the above embodiments are intended only to illustrate the technical solutions of the present application and not to limit them; although the present application is described in detail with reference to the preceding embodiments, it should be understood by those skilled in the art that, within the spirit and principles of the present application, it is still possible to modify the technical solutions described in the preceding embodiments or to make equivalent substitutions for some or all of the technical features thereof; and that these modifications or substitutions do not remove the corresponding technical solutions from the scope of the present application.

What is claimed is:

1. A quick battery replacement system for a long-distance transport path, comprising:

battery replacement stations provided at intervals along the long-distance transport path for replacing quickly and charging a battery of a vehicle whose battery is able to be quickly replaced;

a cloud-based battery replacement service platform connected to the battery replacement stations and the vehicle via a network for managing the battery replacement stations and providing services to the vehicle; and the vehicle obtaining distribution information, battery status information and service information of the battery replacement stations through the cloud-based battery replacement service platform, wherein the cloud-based battery replacement service platform comprises:

a battery replacement solution processing module for determining a battery replacement solution according to the distribution information and the service information of the battery replacement stations provided along the long-distance transport path and battery information of the vehicle, and pushing the battery replacement solution to the vehicle free of charge or for a fee;

a battery replacement station management module for interacting with and managing the battery replacement stations; and a vehicle real-time interaction module for interacting with the vehicle, and sending an alert to the vehicle and providing a real-time service to the vehicle, wherein the cloud-based battery replacement service platform further comprises a promotion module for identifying a vehicle whose battery is being replaced, in response that the vehicle is not registered to use battery replacement solution push service on the cloud-based battery replacement service platform, generating a first promotion message for promoting the cloud-based battery replacement service platform and pushing the first promotion message to the vehicle; and in response that the vehicle is already registered to use the cloud-based battery replacement service platform, pushing a third promotion message to the vehicle, wherein the third promotion message comprises an instant message from physical states for catering, entertainment. maintenance, shopping near the battery replacement station to operate.

2. The system according to claim 1, wherein the promotion module is further configured for generating and pushing a second promotion message to a terminal held by an operation and maintenance personnel of the cloud-based battery replacement service platform to trigger manual service.

3. The system according to claim 1, wherein the vehicle real-time interaction module is configured further for obtaining driving modes of the vehicle, the driving modes of the vehicle comprise an intelligent mode and a driver takeover mode, wherein the intelligent mode is configured for autonomously selecting a driving strategy of a motor according to load weight, and the driver module is configured for autonomously selecting a driving strategy of the motor by driver, and the driving strategy of the motor supports a single motor mode and/or a multi-motor mode.

4. The system according to claim 1, wherein each battery replacement station is provided with a battery replacement station control unit, a battery storage device, a battery charging device, a quick battery replacement device and a battery maintenance device;

the battery storage device for providing battery hosting services and storing batteries in the battery replacement stations;

the battery charging device for providing battery charging services;

the quick battery replacement device for providing battery replacement services;

the battery maintenance device for testing and maintaining the batteries; and the battery replacement station control unit for communicating with the cloud-based battery replacement service platform and controlling the battery storage device, the battery charging device, the quick battery replacement device and the battery maintenance device.

5. The system according to claim 1, wherein two adjacent battery replacement stations are spaced 30-600 km on the long-distance transport path.

6. The system according to claim 1, wherein the vehicle is a pure electric vehicle, an extended program electric vehicle or a plug-in hybrid vehicle, and the vehicle is a cargo vehicle, a dump vehicle, a tractor or a semi-trailer.

7. A battery replacement operation device, wherein the operation device operates on a cloud-based battery replacement service platform in the quick battery replacement system for a long-distance transport path according to claim 1, the device comprises:

a transport path parameter acquisition module for obtaining a starting point, an ending point of the long-distance transport path and battery information of a vehicle whose battery is able to be quickly replaced;

a transport path determination module for determining a long-distance transport path according to the starting point and the ending point;

a battery replacement station information acquisition module for obtaining distribution information and service information of the battery replacement stations provided along the long-distance transport path;

a battery replacement plan module for determining a battery replacement solution according to the distribution information and service information of the battery replacement stations provided along the long-distance transport path and the battery information;

a battery replacement solution push module for pushing the battery replacement solution to the vehicle.

8. A battery replacement operation method, applied on a cloud-based battery replacement service platform in a quick battery replacement system for a long-distance transport path, the method comprising:

obtaining a starting point, an ending point of the long-distance transport path and battery information of a vehicle whose battery is able to be quickly replaced;

determining a long-distance transport path according to the starting point and the ending point;

obtaining distribution information and service information of the battery replacement stations provided along the long-distance transport path;

determining a battery replacement solution according to the distribution information and service information of the battery replacement stations provided along the long-distance transport path and the battery information; and pushing the battery replacement solution to the vehicle, wherein the determining the battery replacement solution according to the distribution information and service information of the battery replacement stations provided along the long-distance transport path and the battery information comprises:

determining a long-distance transport road condition according to the long-distance transport path;

obtaining model information of the vehicle, and determining a corresponding driving strategy of a motor according to the model information;

determining an estimated long-distance driving distance of the vehicle according to the driving strategy of the motor, the long-distance transport path and the long-distance transport road condition;

determining a current remaining driving distance of the vehicle according to the battery information;

determining whether planning conditions for the battery replacement solution are met according to the current remaining driving distance and the estimated long-distance driving distance; and in response that the planning conditions for the battery replacement solution are met. generating at least one battery replacement solution according to the distribution information and service information of the battery replacement station and the battery information, and pushing the at least one battery replacement solution to the vehicle.

9. The method according to claim 8, wherein the driving strategy of the motor comprises a first driving strategy and a second driving strategy, the first driving strategy is configured to describe a working state of the motor under each long-distance transport road condition and the second driving strategy is configured to describe a working state of the motor under each gear; wherein the working state of the motor is presented by a number of motors in the working state and power consumption of each motor in the working state.

10. The method according to claim 8, wherein the distribution information of the battery replacement station comprises an identification of the battery replacement station and a location of the battery replacement station, the service information comprises businesses supported currently by the battery replacement station corresponding to the identification of the battery replacement station, the business comprises a battery maintenance business, a battery hosting business, a battery charging business and/or a battery leasing business;

the generating at least one battery replacement solution according to the distribution information and service information of the battery replacement station and the battery information comprises:

determining at least one target battery replacement station and a target business provided by the at least one target battery replacement station according to the distribution information and service information of the battery replacement station and the battery information;

generating at least one candidate battery replacement solution according to the identification, location and target service of the at least one target battery replacement station; and determining at least one battery replacement solution in the at least one candidate battery replacement solution according to selection conditions of preset solutions.

11. The method according to claim 10, wherein the battery information comprises a battery identification and a battery capacity; the determining at least one target battery replacement station according to the distribution information and service information of the battery replacement station and the battery information comprises:

determining, according to each battery identification, a latest detecting status of the battery corresponding to each battery identification;

making a first determination, according to the latest detecting status and operation parameters of the vehicle, to determine whether the battery corresponding to each battery identification needs to be maintained;

making a second determination, according to the battery capacity corresponding to the each battery identification, to determine whether the battery corresponding to each battery identification needs to be replaced; and determining the target battery replacement station according to a result of the first determination, a result of the second determination, the distribution information and the service information of the battery replacement station.

12. The method according to claim 8, further comprising:

updating, in response to a first interaction instruction, the long-distance transport path, the long-distance transport road condition, the battery information, and the distribution information and service information of the battery replacement stations provided along the long-distance transport path;

repeating the step of: determining the battery replacement solution according to the distribution information and service information of the battery replacement stations provided along the long-distance transport path and the battery information.

13. A non-transitory computer readable storage medium, wherein when instructions in the non-transitory computer readable storage medium are executed by a processor of an electronic device, the electronic device performs the battery replacement operation method according to claim 8.

* * * * *